United States Patent
Lee et al.

(10) Patent No.: US 8,889,278 B2
(45) Date of Patent: Nov. 18, 2014

(54) CONTACT PAD FOR SENSING VOLTAGE OF CELL MODULE ASSEMBLY AND CELL MODULE ASSEMBLY

(75) Inventors: Ju-Seok Lee, Chungbuk (KR); Jin-Kyu Shin, Daejeon (KR); John E. NamGoong, Chungbuk (KR)

(73) Assignee: LG Chem, Ltd., Seoul (KR)

( * ) Notice: Subject to any disclaimer, the term of this patent is extended or adjusted under 35 U.S.C. 154(b) by 438 days.

(21) Appl. No.: 12/667,740

(22) PCT Filed: Jul. 22, 2009

(86) PCT No.: PCT/KR2009/004051
§ 371 (c)(1),
(2), (4) Date: Jan. 5, 2010

(87) PCT Pub. No.: WO2010/038939
PCT Pub. Date: Apr. 8, 2010

(65) Prior Publication Data
US 2011/0223453 A1 Sep. 15, 2011

(30) Foreign Application Priority Data
Oct. 2, 2008 (KR) .......................... 10-2008-0097332

(51) Int. Cl.
| | |
|---|---|
| H01M 10/48 | (2006.01) |
| G01N 27/42 | (2006.01) |
| G01N 27/416 | (2006.01) |
| H01M 2/20 | (2006.01) |
| H01M 4/66 | (2006.01) |

(52) U.S. Cl.
CPC .............. *H01M 10/48* (2013.01); *H01M 2/202* (2013.01); *H01M 4/668* (2013.01)

USPC .............................. 429/92; 324/425; 324/433

(58) Field of Classification Search
None
See application file for complete search history.

(56) References Cited

U.S. PATENT DOCUMENTS

| | | | | |
|---|---|---|---|---|
| 4,247,981 A | * | 2/1981 | Walters | ........................... 29/845 |
| 5,449,570 A | | 9/1995 | Inkmann et al. | |
| 5,504,664 A | * | 4/1996 | Ostema | ........................ 362/104 |
| 6,423,441 B1 | * | 7/2002 | Ronning et al. | ................. 429/82 |
| 6,818,343 B1 | | 11/2004 | Kimoto et al. | |
| 2006/0177734 A1 | | 8/2006 | Yao | |

FOREIGN PATENT DOCUMENTS

| | | |
|---|---|---|
| CN | 2549995 Y | 5/2003 |
| JP | 2003-197270 A | 7/2003 |
| JP | 2003-264999 A1 | 9/2003 |
| JP | 2007-265858 A | 10/2007 |

* cited by examiner

*Primary Examiner* — Ula C Ruddock
*Assistant Examiner* — Daniel Gatewood
(74) *Attorney, Agent, or Firm* — Birch, Stewart, Kolasch & Birch, LLP

(57) ABSTRACT

A contact pad configured to sense the voltage of a cell module assembly including at least one battery cell, is electrically connected to a voltage sensing module for measuring the voltage of the battery cell in the cell module assembly and electrically contacted with an electrode of the battery cell, and is made of a conductive organic elastomer, thereby improving reliability of electrical contact with each battery cell, and effectively preventing malfunction of the cell module assembly caused by impurities, external physical shocks and so on.

6 Claims, 3 Drawing Sheets

CONTACT PAD FOR SENSING VOLTAGE OF CELL MODULE ASSEMBLY AND CELL MODULE ASSEMBLY

TECHNICAL FIELD

The present invention relates to a contact pad which is connected to an external electrical and electronic module and electrically contacted with an electrode of each battery cell in a cell module assembly to sense and manage the voltage of the battery cell. More particularly, the present invention relates to a contact pad made of a conductive organic elastomer to improve reliability of electrical contact with the electrode of the battery cell.

BACKGROUND ART

A cell module assembly (CMA) includes at least one battery cell capable of charging and discharging, an electrical and electronic module required for a battery management system (BMS), and so on.

As shown in FIG. 1, specifically the cell module assembly includes a cell pack 10 composed of at least one battery cell, an assembly housing 20, an electrode 30 of the battery cell, a contact means 40 contacted with the electrode 30 of the battery cell, a support 50, and a wiring line 60 for establishing an electrical connection with an external module.

The wiring line 60 is electrically connected with a voltage sensing module 70, a forced current (balance current) inflow module 80 or the like. The voltage sensing module 70 measures the voltage of the battery cell to operate the cell module assembly including at least one battery cell.

Typically, a battery containing a secondary cell such as a cell module assembly or the like, experiences a repeated charge and discharge and has an electrochemically unstable factor, and thus, it needs to continuously monitor the voltage of the battery cell.

The voltage sensing module 70 is configured to continuously monitor the voltage of the battery cell. The forced current inflow module 80 is configured to balance the voltage of each battery cell by introducing an electric current (balance current) forcedly into an electrode of a battery cell required for balancing when there is a voltage deviation between each battery cell in the cell pack, to efficiently operate the cell module assembly.

Generally, the voltage sensing module 70 or the forced current inflow module 80 is linked with the battery management system. It is obvious that the voltage sensing module 70 or the forced current inflow module 80 is not limited to any specific term or physical configuration, if it executes the above-mentioned function.

Referring to FIG. 1, the contact means 40 is connected to the wiring line 60 through the medium of the support 50, and is, at one surface, electrically contacted with the electrode 30 of the battery cell.

Conventionally, the contact means 40 is formed of a spring. As shown in FIG. 2, the contact means 40 is physically contacted with the electrode 30 of the battery cell to make a predetermined point contact (A).

However, the point contact (A) disadvantageously has a low reliability of electrical contact. If the point contact (A) is contaminated with impurities and so on, the likelihood of a poor electrical contact is high.

Moreover, the contact means 40 formed of a spring involves bolting, welding, riveting and so on in the manufacture of the cell module assembly. This causes inconvenience to an assembly process and reduction in productivity and operational efficiency.

DISCLOSURE OF INVENTION

Technical Problem

Therefore, it is an object of the invention to solve the problems, and the present invention provides a contact means that can improve reliability and durability of electrical contact with an electrode of a battery cell, and a cell module assembly comprising the same.

The other objects and advantages will be described below and understood by embodiments of the present invention. And, the objects and advantages of the present invention may be incorporated by configurations set forth in accompanying claims, or a combination thereof.

Technical Solution

In order to achieve the object, a contact pad configured to sense the voltage of a cell module assembly including at least one battery cell, is electrically connected to a voltage sensing module for measuring the voltage of the battery cell in the cell module assembly and electrically contacted with an electrode of the battery cell, and is made of a conductive organic elastomer.

The contact pad may have a fit means, into which the electrode of the battery cell is fitted. More preferably, the fit means may include a fit part that has an inwardly slanted inner surface and extends from the slanted inner surface. The fit part may be dimensioned to receive the electrode of the battery cell.

Preferably, the fit means may further have a contact part made of a metal, through which an external balance current is introduced, the contact part being disposed in the fit part and electrically contacted with the electrode of the battery cell when the electrode is fitted into the fit means.

Meanwhile, according to another aspect of the present invention, a cell module assembly comprises a housing having an inner space; at least one battery cell provided in the inner space of the housing; and a contact pad electrically connected to a voltage sensing module for measuring the voltage of the battery cell and electrically contacted with an electrode of the battery cell, and the contact pad may be made of a conductive organic elastomer.

Advantageous Effects

According to the present invention, a surface contact is made between a contact pad and an electrode of a battery cell to improve reliability of electrical contact therebetween and ensure a larger contact area therebetween, thereby solving and overcoming a poor electrical contact problem caused by external impurities and so on.

And, the present invention incorporates an electrical contact structure into a simple fit structure to simplify a process of the cell module assembly, thereby improving productivity and operational efficiency, so that a more economical cell module assembly can be manufactured and the convenience of an assembly process can be improved.

Furthermore, the present invention is configured such that an electric current for voltage balancing is introduced through a contact part made of a metal having a low electrical resistance, thereby minimizing the loss of power.

BRIEF DESCRIPTION OF THE DRAWINGS

These and other features, aspects, and advantages of preferred embodiments of the present invention will be more fully described in the following detailed description, taken accompanying drawings.

MODE FOR INVENTION

Hereinafter, the present invention will be described in detail with reference to the accompanying drawings. Prior to the description, it should be understood that the terms used in the specification and appended claims should not be construed as limited to general and dictionary meanings, but interpreted based on the meanings and concepts corresponding to technical aspects of the present invention on the basis of the principle that the inventor is allowed to define terms appropriately for the best explanation.

Therefore, the description proposed herein is just a preferable example for the purpose of illustrations only, not intended to limit the scope of the invention, so it should be understood that other equivalents and modifications could be made thereto without departing from the spirit and scope of the invention.

Figure 3:
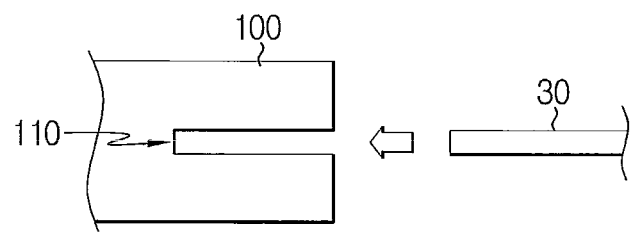
FIG. 3 is a cross-sectional view of a contact pad according to a preferred embodiment of the present invention.

FIG. 3 is a cross-sectional view of a contact pad 100 for sensing the voltage of a cell module assembly according to a preferred embodiment of the present invention. The contact pad 100 of FIG. 3 is made of a conductive organic elastomer.

The organic elastomer has conductive properties, and may include materials having physical characteristics of organic elastomers such as rubber and so on, for example, a conductive silicone.

Figure 1:
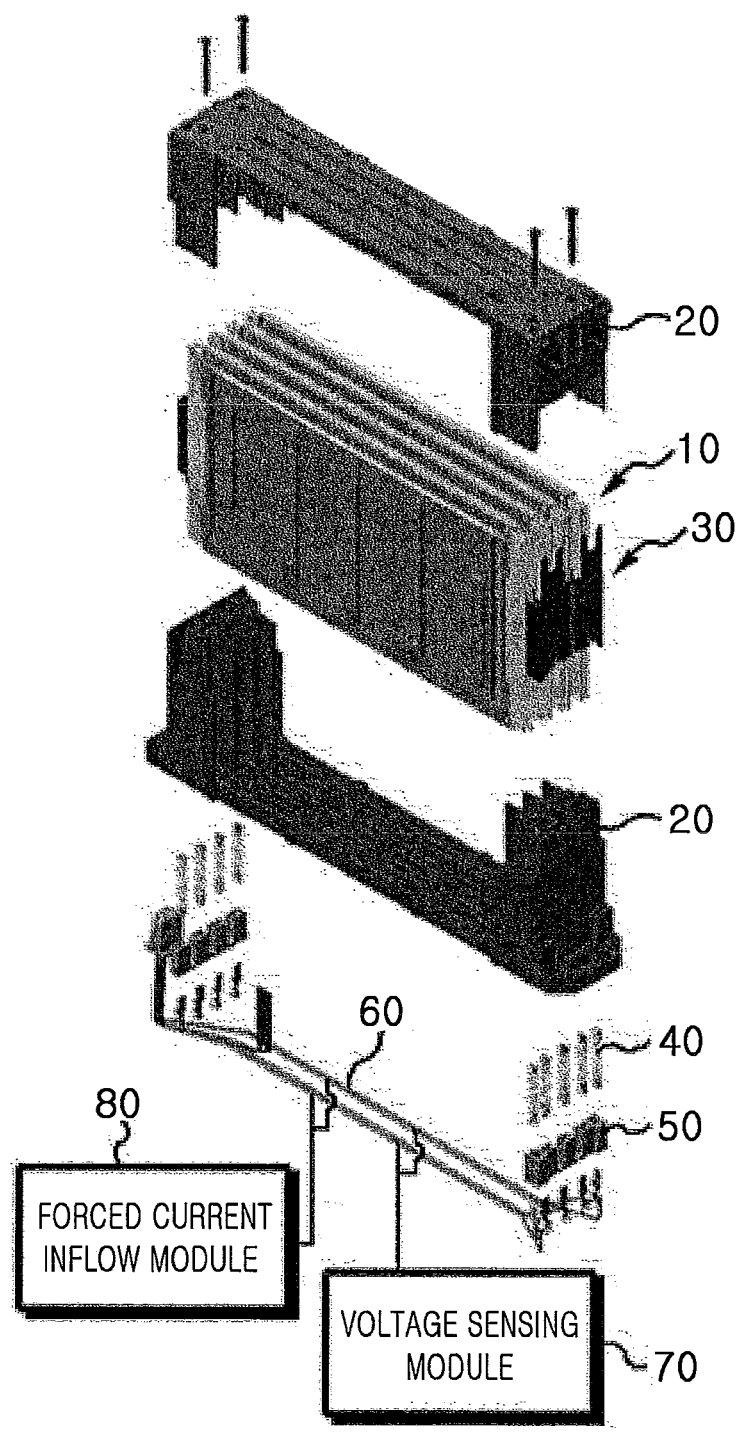
FIG. 1 is an exploded perspective view of a general battery cell module.
Figure 2:
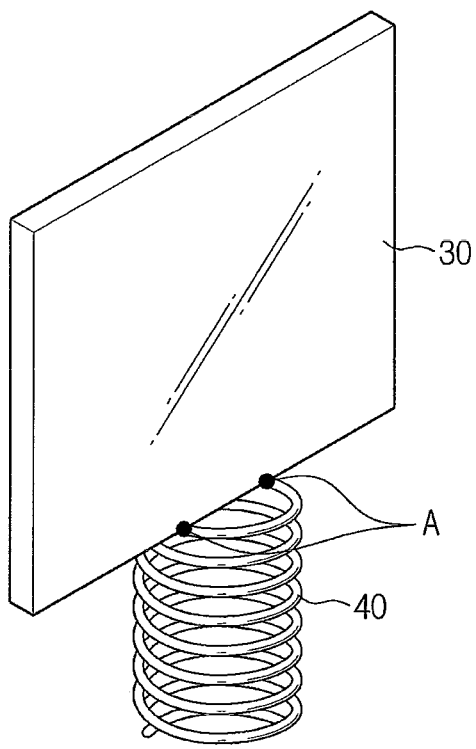
FIG. 2 is a view of a point contact between a conventional contact means and a battery cell.

The contact pad 100 made of the conductive organic elastomer according to the present invention is substituted for the conventional contact means 40 (See FIG. 1) formed of a spring, so that a surface contact is made, but not a point contact, between the contact pad 100 and an electrode 30 of a battery cell to improve reliability of electrical connection therebetween.

To further improve the contact area and electrical properties such as durability of contact between the contact pad 100 and the electrode 30 and so on, the contact pad 100 preferably has a fit means 110 into which the electrode 30 of the battery cell is fitted, as shown in FIG. 3.

Figure 4:
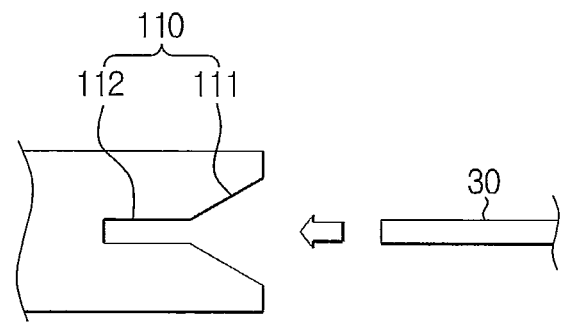
FIG. 4 is a cross-sectional view of a contact pad according to another embodiment of the present invention.

Referring to FIG. 4, according to another embodiment of the present invention, more preferably the fit means 110 of the contact pad 100 more preferably includes a fit part 112 that has an inwardly slanted inner surface 111 and extends from the slanted inner surface 111. The fit part 112 is dimensioned to receive the electrode 30 of the battery cell.

The slanted inner surface 111 guides the electrode 30 of the battery cell to induce easy and rapid fitting of the electrode 30 into the contact pad 100. And, the slanted inner surface 111 is pressed against the outside to induce easy and rapid disjoining of the electrode 30 from the contact pad 100.

The contact pad 100 of the present invention is also made of a material having elastic properties. Thus, the fit between the electrode 30 of the battery cell and the fit means 110 of the contact pad 100 can be maintained due to the physical properties of the contact pad 100. To sufficiently make use of the elastic properties of the contact pad 100, the dimension of the fit part 112 is more preferably equal to or slightly smaller than the thickness of the electrode 30 of the battery cell.

Although FIGS. 3 and 4 each shows the contact pad 100 according to an embodiment of the present invention, the contact pad 100 may be variously configured depending on the shape or type of the electrode 30 according to various embodiments of the present invention. Such variations are not to be regarded as a departure from the spirit and scope of the present invention, and all such modifications are intended to be included within the spirit and scope of the invention.

As mentioned above, as the contact pad 100 of the present invention is electrically contacted with the electrode 30 of the battery cell, the voltage sensing module 70 or battery management system can measure or monitor the voltage of the battery cell. Accordingly, if there is a voltage deviation between each battery cell, that is, the sensed voltage of each battery cell is not the same, the voltage of each battery cell can be balanced (equalized) to effectively operate the battery.

For this purpose, the present invention may be configured such that a balance current is introduced into an electrode of a battery cell required for balancing through the contact pad 100 made of a conductive elastomer. At this time, more preferably the present invention may be configured to minimize the loss of power.

Figure 5:
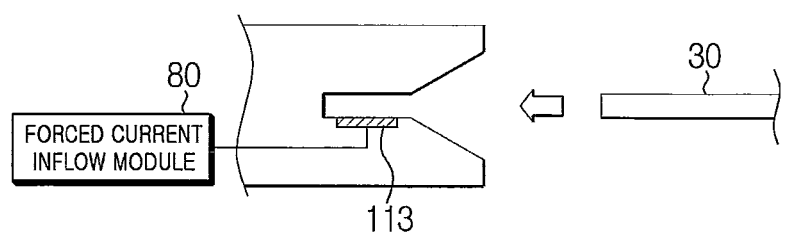
FIG. 5 is a cross-sectional view of a contact pad according to yet another embodiment of the present invention.

To minimize the loss of electrical properties such as an electric current and so on, as shown in FIG. 5, preferably the fit means 110 may further have a contact part 113 made of a metal. The contact part 113 is disposed in the fit part 112 and electrically contacted with the electrode 30 of the battery cell when the electrode 30 is fitted into the fit means 110. In this manner, an external balance current may be introduced through the contact part 113 made of a metal.

As mentioned above, because the contact part 113 is made of a metal having a low electrical resistance, the contact part 113 of the present invention is proper to reduce the loss of electrical properties.

To improve the electrical contact with the electrode 30 of the battery cell, the contact part 113 may be configured to protrude from the fit part 112 to some extent, or may be formed of a certain spring plate.

Preferably, the contact part 113 made of a metal and a fitted portion between the fit means 110 and the electrode 30 of the battery cell may be insulated to induce introduction of a balance current only into the electrode 30 of the battery cell.

As such, it should be understood that the detailed description and specific examples, while indicating preferred embodiments of the invention, are given by way of illustration only, since various changes and modifications within the scope of the invention will become apparent to those skilled in the art from this detailed description.

What is claimed is:

1. A contact pad for sensing voltage of a cell module assembly, the contact pad being electrically connected to a voltage sensing module for measuring voltage of a battery cell in the cell module assembly including at least one battery cell, the contact pad being in direct contact with an electrode of the battery cell so as to be electrically contacted with the electrode of the battery cell, wherein the contact pad is made of a conductive organic elastomer, wherein the contact pad forms a fit means into which the electrode of the battery cell is fitted, and wherein the fit means is a recess in the conductive organic elastomer, the recess having a sidewall and a bottom wall.

2. The contact pad for sensing voltage of a cell module assembly according to claim 1, wherein the fit means includes a fit part having an inwardly slanted inner surface and extending from the slanted inner surface, the fit part being dimensioned to receive the electrode of the battery cell.

3. The contact pad for sensing voltage of a cell module assembly according to claim 2, wherein the fit means further has a contact part made of a metal, through which an external balance current is introduced, the contact part being disposed in the fit part and electrically contacted with the electrode of the battery cell when the electrode is fitted into the fit means.

4. A contact pad for sensing voltage of a cell module assembly, the contact pad being electrically connected to a voltage sensing module for measuring voltage of a battery cell in the cell module assembly including at least one battery cell, the contact pad being in direct contact with an electrode of the battery cell so as to be electrically contacted with the electrode of the battery cell,
   wherein the contact pad is made of a conductive organic elastomer, and
   wherein the contact pad forms a fit part into which the electrode of the battery cell is fitted, and
   wherein the fit part is a recess in the conductive organic elastomer, the recess having a sidewall and a bottom wall.

5. The contact pad for sensing voltage of a cell module assembly according to claim 1, wherein the fit means is configured to make a surface contact with the electrode.

6. The contact pad for sensing voltage of a cell module assembly according to claim 4, wherein the fit part is configured to make a surface contact with the electrode.

* * * * *